United States Patent
Ghandour et al.

(10) Patent No.: US 12,410,761 B1
(45) Date of Patent: Sep. 9, 2025

(54) THRUST REVERSER MANUAL DRIVE SYSTEM

(71) Applicant: Rohr, Inc., Chula Vista, CA (US)

(72) Inventors: Imad D. Ghandour, San Diego, CA (US); Corey R. Gloede, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/593,540

(22) Filed: Mar. 1, 2024

(51) Int. Cl.
*F02K 1/70* (2006.01)
*B64D 29/06* (2006.01)
*F02K 1/76* (2006.01)

(52) U.S. Cl.
CPC ............. *F02K 1/70* (2013.01); *B64D 29/06* (2013.01); *F02K 1/766* (2013.01)

(58) Field of Classification Search
CPC ... F02K 1/70; F02K 1/72; F02K 1/763; F02K 1/766; F02C 7/32; B64D 29/06; B64D 29/08
See application file for complete search history.

(56) References Cited

U.S. PATENT DOCUMENTS

| | | | |
|---|---|---|---|
| 6,036,238 A * | 3/2000 | Lallament | E05C 19/145 292/DIG. 31 |
| 9,816,586 B2 | 11/2017 | Chakkera | |
| 10,527,001 B2 | 1/2020 | Tisseau | |
| 11,085,396 B2 | 8/2021 | Morgan | |
| 2004/0139726 A1* | 7/2004 | Colotte | F02K 1/763 60/230 |
| 2008/0072571 A1* | 3/2008 | Beardsley | F02K 1/72 60/226.2 |
| 2015/0107220 A1* | 4/2015 | Chakkera | F02K 1/06 239/265.33 |
| 2016/0230703 A1* | 8/2016 | Tisseau | F02K 1/763 |
| 2016/0312511 A1* | 10/2016 | Chakkera | F16H 25/2454 |
| 2021/0285402 A1* | 9/2021 | Morgan | F02K 1/766 |

* cited by examiner

*Primary Examiner* — Andrew H Nguyen
(74) *Attorney, Agent, or Firm* — Getz Balich LLC (57) ABSTRACT

An aircraft nacelle is provided that includes a fan cowl, a thrust reverser translating sleeve, and a thrust reverser. The fan cowl and the sleeve are configured to circumferentially enclose an engine. The thrust reverser includes a thrust reverser actuation system (TRAS). The TRAS includes first and second actuators, and a portable manual drive unit (MDU). The first and second actuators are each configured to translate the sleeve linearly between stowed and deployed positions, and each has an actuator input drive port. The portable MDU has an MDU input drive port, an MDU output drive port, and a torque limiting device. The MDU output drive port is configured for engagement with the actuator input drive port. The portable MDU is configured for releasable engagement with the first actuator and for releasable engagement with the second actuator.

14 Claims, 4 Drawing Sheets

THRUST REVERSER MANUAL DRIVE SYSTEM

BACKGROUND OF THE INVENTION

1. Technical Field

The present disclosure relates to aircraft nacelle thrust reversers in general and to manual drive units for a thrust reverser in particular.

2. Background Information

Aircraft powered by gas turbine engines using jet engines typically use thrust reversers to provide opposing ("reverse") thrust that operates to slow the aircraft. Cascade type thrust reversers use a vane cascade that is covered or uncovered by a thrust reverser translating sleeve extending the perimeter of the engine nacelle. The vane cascade is configured to direct airflow forward to produce the reverse thrust. In a thrust reverser non-actuated configuration, the thrust reverser translating sleeve is disposed in a forward position and the vane cascades are blocked. In an actuated condition, the thrust reverser translating sleeve is translated aft to uncover the vane cascade. Translation of the thrust reverser translating sleeve in an aft direction or a forward direction may be accomplished using two or more actuators (e.g., hydraulically powered, or electrically powered, or mechanically powered, or any combination thereof) configured to produce the linear translation of the thrust reverser translating sleeve. Each actuator typically includes a manual drive unit (MDU) in communication with the respective actuator that can be used during maintenance to enable an operator to translate the thrust reverser translating sleeve. The power (e.g., torque) required to drive the actuators via the MDUs typically necessitates a relatively large MDU that adds weight and cost to the thrust reverser assembly. The actuators, in turn, must be configured to support the MDUs which typically also adds weight and cost to the thrust reverser assembly. It would be beneficial to provide an thrust reverser actuation system with an improved manual drive unit mechanism.

SUMMARY

According to an aspect of the present disclosure, an aircraft nacelle is provided that includes a fan cowl, a thrust reverser translating sleeve, and a thrust reverser. The fan cowl and the thrust reverser translating sleeve are configured to circumferentially enclose an engine. The thrust reverser includes a thrust reverser actuation system (TRAS). The TRAS includes a first actuator, a second actuator, and a portable manual drive unit (MDU). The first and second actuators are each configured to translate the thrust reverser translating sleeve linearly between a thrust reverser translating sleeve stowed position and a thrust reverser translating sleeve deployed position, and each has an actuator input drive port. The portable MDU has an MDU input drive port, an MDU output drive port, and a torque limiting device. The MDU output drive port is configured for engagement with the actuator input drive port. The first and second actuators are circumferentially spaced apart from one another. The portable MDU is configured for releasable engagement with the first actuator to drive the first actuator, and the portable MDU is configured for releasable engagement with the second actuator to drive the second actuator.

In any of the aspects or embodiments described above and herein, the fan cowl may include first and second fan cowl members. The first and second fan cowl members may be pivotally attached at points adjacent a gravitational top of nacelle. The first and second fan cowl members are disposable in a closed position or in an open position. The TRAS is configured such that the portable MDU is not engaged with either the first actuator or the second actuator when the first fan cowl member and the second cowl member are disposed in the closed position.

In any of the aspects or embodiments described above and herein, the first actuator may be disposed adjacent the first cowl member and the second actuator may be disposed adjacent the second cowl member. The nacelle may be configured such that the first cowl member cannot be disposed in the closed position when the portable MDU is engaged with first actuator and the second cowl member cannot be disposed in the closed position when the portable MDU is engaged with second actuator.

In any of the aspects or embodiments described above and herein, the first cowl member may include a first blocker configured to contact the portable MDU when the portable MDU is engaged with the first actuator and thereby prevent the first cowl member from being disposed in the closed position when the portable MDU is engaged with the first actuator, and the second cowl member may include a second blocker configured to contact the portable MDU when the portable MDU is engaged with the second actuator and thereby prevent the second cowl member from being disposed in the closed position when the portable MDU is engaged with the second actuator.

In any of the aspects or embodiments described above and herein, the nacelle may include stowage bracketry configured to retain the MDU.

In any of the aspects or embodiments described above and herein, the portable MDU may include an MDU input drive port configured for engagement with a driving tool.

In any of the aspects or embodiments described above and herein, the first actuator and the portable MDU may be configured for releasable attachment to one another, and the second actuator and the portable MDU may be configured for releasable attachment to one another.

In any of the aspects or embodiments described above and herein, the nacelle may include one or more first mounting brackets disposed adjacent the first actuator configured to positionally locate the portable MDU relative to the first actuator when the portable MDU is engaged with the first actuator, and may include one or more second mounting brackets disposed adjacent the second actuator configured to positionally locate the portable MDU relative to the second actuator when the portable MDU is engaged with the second actuator.

In any of the aspects or embodiments described above and herein, the thrust reverser may include a cascade, and the cascade may be exposed when the thrust reverser translating sleeve is disposed in the thrust reverser translating sleeve deployed position, and the cascade may be covered when the thrust reverser translating sleeve is in the thrust reverser translating sleeve stowed position.

According to an aspect of the present disclosure, a method of actuating a thrust reverser portion of a nacelle is provided. The nacelle include a fan cowl and an thrust reverser translating sleeve, and the fan cowl and the thrust reverser translating sleeve are configured to circumferentially enclose an engine. The method includes: providing first and second actuators, each configured to translate the thrust reverser translating sleeve linearly between a thrust reverser translating sleeve stowed position and a thrust reverser translating sleeve deployed position, and each having an actuator input drive port, wherein the first and second actuators are circumferentially spaced apart from one another; and using a portable manual drive unit (MDU) having an MDU input drive port, an MDU output drive port, and a torque limiting device, to drive the first actuator to translate the thrust reverser translating sleeve, and using the portable MDU to drive the second actuator to translate the thrust reverser translating sleeve; wherein the first and second actuators are circumferentially spaced apart from one another, and the portable MDU is configured for releasable engagement with the first actuator to drive the first actuator, and the portable MDU is configured for releasable engagement with the second actuator to drive the second actuator.

In any of the aspects or embodiments described above and herein, the fan cowl includes a first and second fan cowl members that are pivotally attached adjacent a gravitational top of nacelle, and the first and second fan cowl members are disposable in a closed position or in an open position; and the method may further include disengaging the portable MDU from the first actuator prior to disposing the first fan cowl member in the closed position, and disengaging the portable MDU from the second actuator prior to disposing the second fan cowl member in the closed position.

According to an aspect of the present disclosure, a thrust reverser actuation system is provided that includes an actuator and a portable manual drive unit (MDU). The actuator is configured to translate a thrust reverser translating sleeve linearly between a stowed position and a deployed position, and the actuator includes an actuator input drive port. The portable MDU has an MDU input drive port, an MDU output drive port, and a torque limiting device. The MDU output drive port is configured for engagement with the actuator input drive port. The portable MDU is configured for releasable engagement with the actuator.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
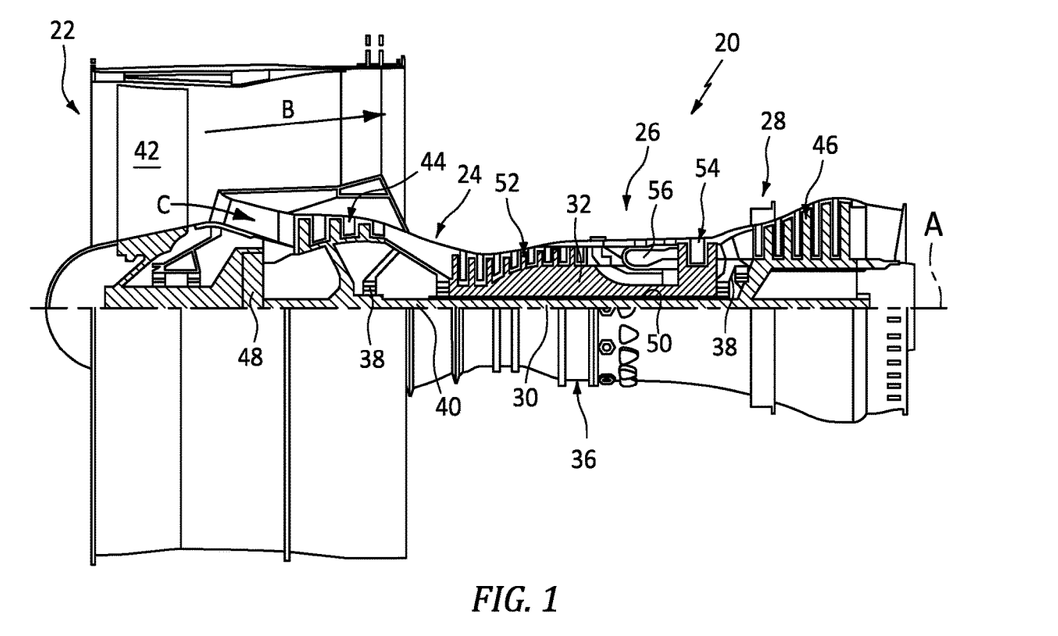
FIG. 1 is a diagrammatic sectional view of a gas turbine engine embodiment.
Figure 2:
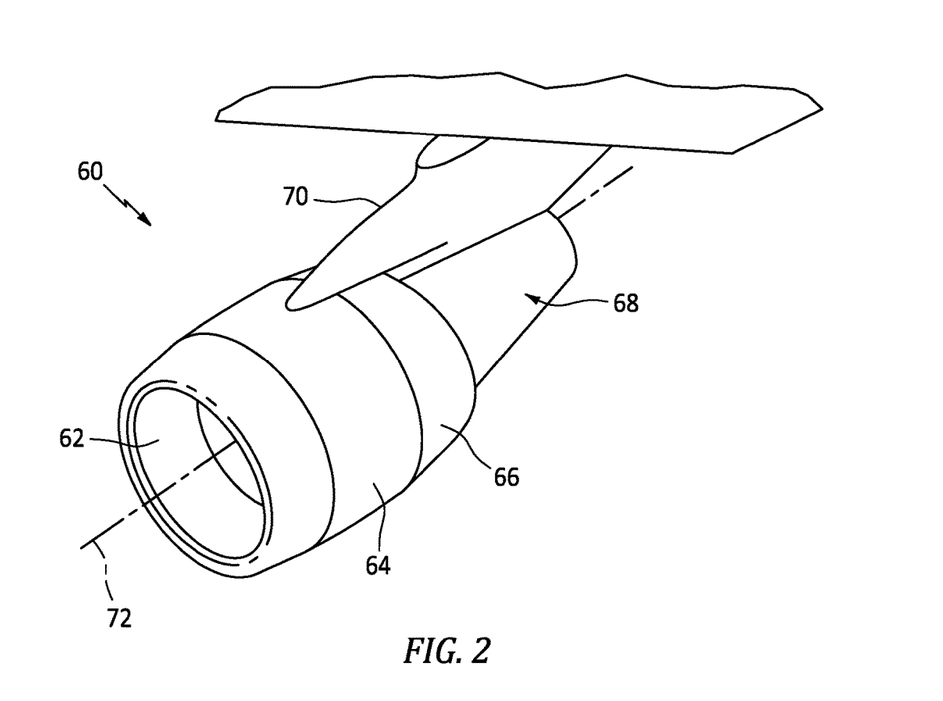
FIG. 2 is a diagrammatic perspective view of a nacelle embodiment with the thrust reverser translating sleeve in a stowed configuration.
Figure 3:
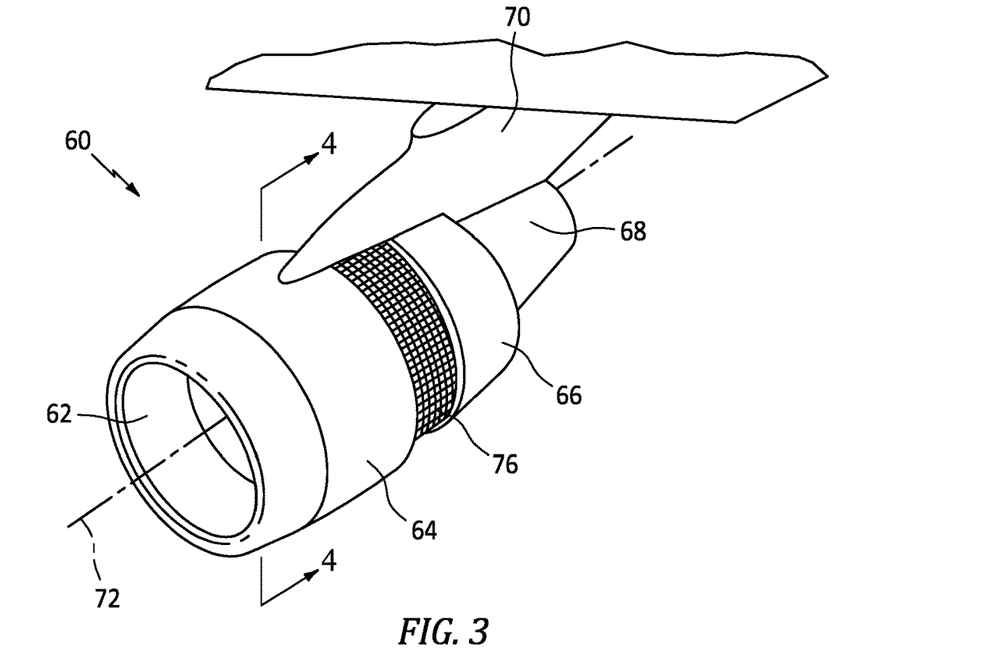
FIG. 3 is a diagrammatic perspective view of the nacelle embodiment shown in FIG. 2 with the thrust reverser translating sleeve in a deployed configuration.

FIG. 1 diagrammatically illustrates an example of a gas turbine engine 20 in the form of a two-spool turbofan type gas turbine engine that includes a fan section 22, a compressor section 24, a combustion section 26, and a turbine section 28. Airflow moves from the fan section 22 to a bypass flow path B or a core flow path C. The compressor section 24 drives air along the core flow path C. Compressed air from the compressor section 24 communicates through the combustion section 26. The products of combustion expand through the turbine section 28. The engine 20 includes a low-speed spool 30 and a high-speed spool 32 mounted for rotation about an engine central longitudinal axis "A" relative to an engine static structure 36. The low-speed spool 30 and the high-speed spool 32 are rotatably supported by several bearing systems 38. The low-speed spool 30 includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30. The high-speed spool 32 includes an outer shaft 50 that interconnects a high-pressure compressor 52 and high-pressure turbine 54. The inner shaft 40 and the outer shaft 50 are concentric and rotate via bearing systems 38 about the engine central longitudinal axis "A", which is collinear with the longitudinal axes of the inner shaft 40 and the outer shaft 50. The combustion section 26 includes one or more combustors 56. Although depicted as a two-spool turbofan gas turbine engine, it should be understood that the concepts described herein are not limited to use with turbofans.

The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a convention axial engine such as that shown in FIG. 1, the fan section 22 is "forward" of the compressor section 24 and the turbine section 28 is "aft" of the compressor section 24. The terms "inner radial" and "outer radial" refer to relative radial positions from the engine centerline "A". An inner radial component or path is disposed radially closer to the engine centerline than an outer radial component or path.

Figure 4:
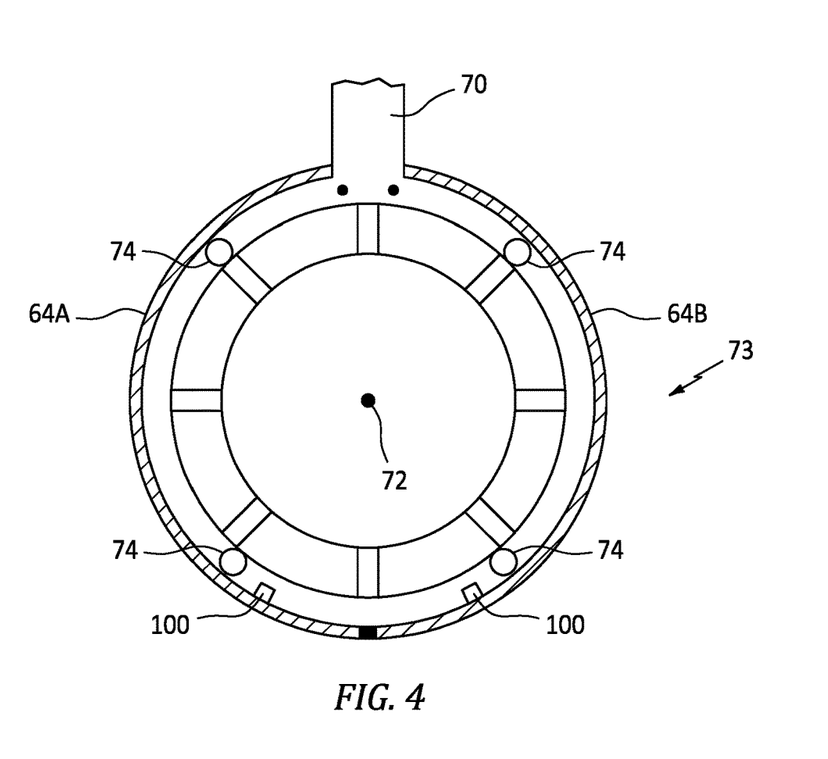
FIG. 4 is a diagrammatic sectional view of a thrust reverser actuation system embodiment with the fan cowl segments in a closed position.
Figure 5:
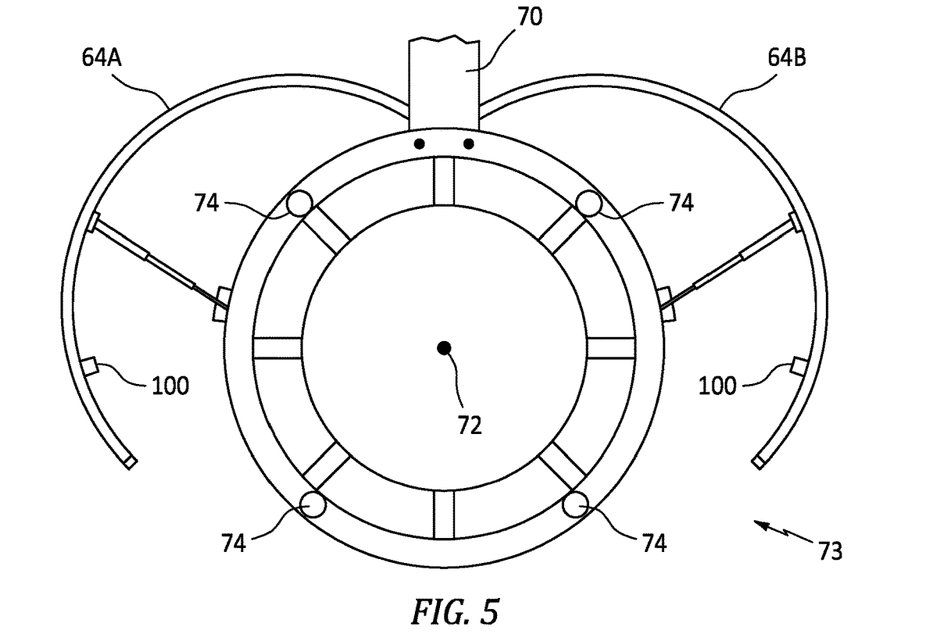
FIG. 5 is a diagrammatic sectional view of the thrust reverser actuation system embodiment shown in FIG. 4 with the fan cowl segments in an open position.

Referring to FIGS. 2-5, a nonlimiting example of a nacelle 60 for an aircraft engine (e.g., a gas turbine engine 20) is shown. The nacelle 60 includes an inlet 62, a fan cowl 64, an thrust reverser translating sleeve 66, and an exhaust section 68. The nacelle 60 may be attached to a pylon 70 that mounts the nacelle 60 to an aircraft wing or aircraft body. The nacelle 60 surrounds the engine providing smooth aerodynamic surfaces for airflow around and into the engine. The fan cowl 64 may include a first fan cowl member 64A and a second fan cowl member 64B. The first and second fan cowl members 64A, 64B may be pivotally attached (e.g., hinged) to the pylon 70 or to a frame structure attached adjacent the gravitational top of nacelle 60. The nacelle 60 is disposed about an axial centerline 72 that typically coincides with the axis of rotation of the engine housed within the nacelle 60. Each of the first and second fan cowl members 64A, 64B may be pivoted between open positions (that provide access into the interior of the nacelle 60—see FIG. 5) and a closed position (e.g., see FIGS. 2-4) where no interior access is permitted and the first and second fan cowl members 64A, 64B are positioned as part of the aerodynamic shape of the nacelle 60 exterior. One or more latch assemblies (not shown) may be used to secure the first and second fan cowl members 64A, 64B in the closed position. FIGS. 4 and 5 are diagrammatic sectional views (see sectional line 4-4 in FIG. 3). FIG. 4 illustrates the fan cowl 64 in a stowed configuration and FIG. 5 illustrates the fan cowl 64 in an open configuration.

Figure 6:
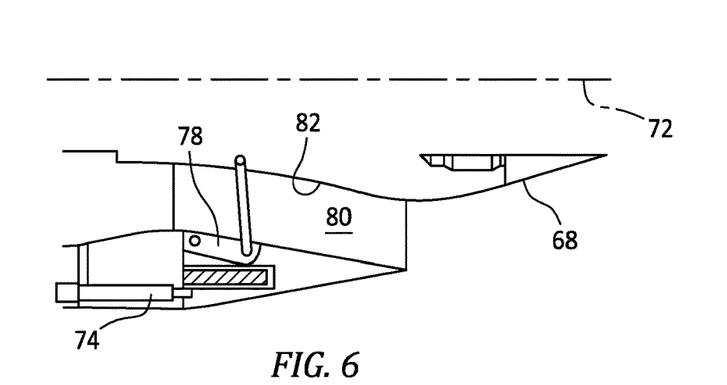
FIG. 6 is a diagrammatic partial view of a thrust reverser actuation system in a stored configuration.
Figure 7:
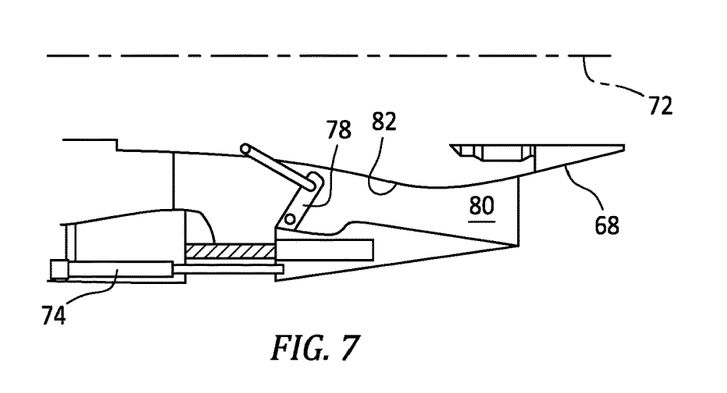
FIG. 7 is a diagrammatic partial view of the thrust reverser actuation system shown in FIG. 6 now in a deployed configuration.

FIGS. 6 and 7 diagrammatically illustrate a portion of a thrust reverser actuation system ("TRAS 73") that includes a plurality of actuators 74 (a single actuator 74 is shown in FIGS. 6 and 7), a cascade 76, and a blocker door 78. FIG. 6 illustrates the thrust reverser translating sleeve 66 and the blocker door 78 in a stowed configuration. FIG. 7 illustrates the thrust reverser translating sleeve 66 and the blocker door 78 in a deployed configuration. When the blocker door 78 is in the stowed configuration, the blocker door 78 resides outside of a flow path 80 disposed between the thrust reverser translating sleeve 66 and an inner boundary surface 82. When the blocker door 78 is in the deployed configuration, the blocker door 78 blocks at least a portion of the flow path 80. When the thrust reverser is being deployed, the actuators 74 are controlled to linearly translate the thrust reverser translating sleeve 66 axially rearward; i.e., in an aft direction. As the thrust reverser translating sleeve 66 translates in the aft direction, the cascade 76 is revealed and the blocker door 78 deploys. When the thrust reverser is being stowed, the opposite happens; i.e., the actuators 74 are controlled to linearly translate the thrust reverser translating sleeve 66 axially forward, the cascade 76 is covered, and the blocker door 78 returns to its stowed position. The preceding description of a thrust reverser is intended to be exemplary rather than limiting in nature, and is provided to illustrate an example of thrust reverser operation to facilitate the description herein.

Figure 8:
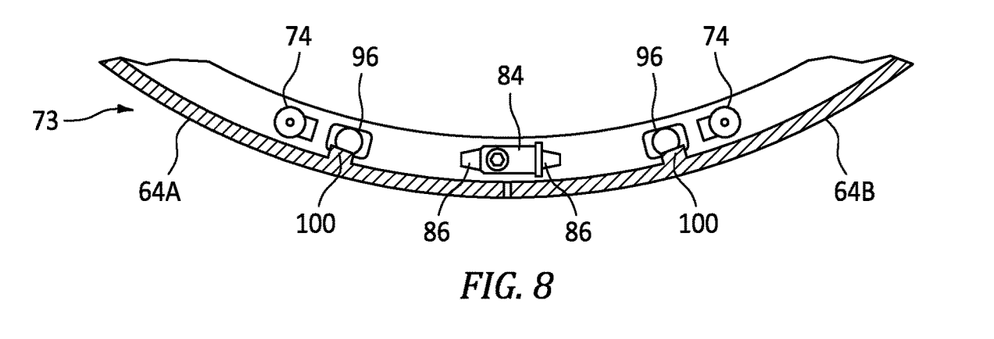
FIG. 8 is a diagrammatic partial view of a thrust reverser actuation system embodiment with the portable manual drive unit in a stowed configuration with the fan cowl segments in a closed position.
Figure 9:
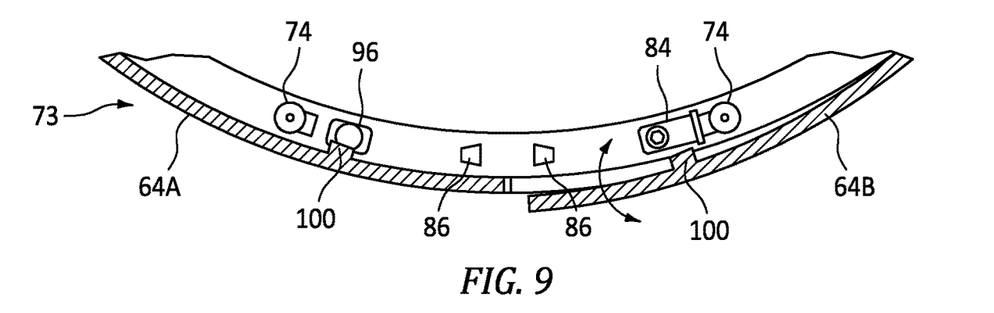
FIG. 9 is a diagrammatic partial view of the thrust reverser actuation system embodiment shown in FIG. 8, now with the portable manual drive unit engaged with an actuator and a fan cowl segment in a partially open position.

Embodiments of the present disclosure include a TRAS 73 that a plurality of actuators 74 configured to linearly translate the thrust reverser translating sleeve 66 in an aft direction or a forward direction, and a portable manual drive unit (MDU-which may also be referred to as a "fly-along" MDU) 84. FIG. 6 diagrammatically illustrates one of the actuators 74 in a non-extended configuration and FIG. 7 diagrammatically illustrates one of the actuators 74 in an extended configuration. FIGS. 8 and 9 diagrammatically illustrate a sectional view wherein the first and second fan cowl members 64A, 64B are sectioned (in a manner like that shown in FIG. 4) to enable portions of the present disclosure TRAS 73 to be shown; e.g., to show the actuators 74 and the portable MDU 84. In FIG. 8, the first and second fan cowl members 64A, 64B are shown in a closed position. In FIG. 9, the second fan cowl member 64B is shown pivoted some amount away from the closed position. The present disclosure actuators 74 may be hydraulically powered, or electrically powered, or mechanically powered, or any combination thereof. Each actuator 74 is configured for engagement with a portable MDU 84; i.e., an MDU 84 configured to be engaged with an actuator 74 but is not permanently connected to the actuator 74. The present disclosure system includes at least one portable MDU 84 that can be used with each actuator 74; the portable MDU 84 may be sequentially moved to and used on each actuator 74 in those system embodiments that include a plurality of actuators 74. When the portable MDU 84 is no longer needed, the present disclosure TRAS 73 may include stowage bracketry 86 for storing the portable MDU 84. FIG. 8 diagrammatically illustrates a portable MDU 84 secured by stowage bracketry 86; i.e., stored so that the portable MDU 84 may "fly-along" with the aircraft. FIG. 9 diagrammatically illustrates a portable MDU 84 removed from the stowage bracketry 86 and engaged with an actuator 74.

Figure 10:
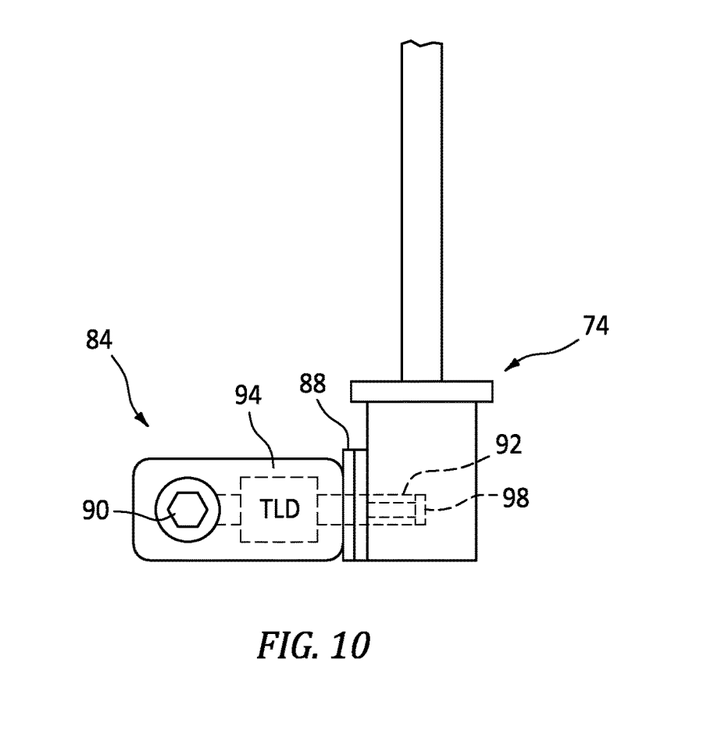
FIG. 10 is a diagrammatic view of a portable manual drive unit embodiment.

Referring to FIG. 10, the portable MDU 84 may include an actuator interface 88, an MDU input drive port 90, an MDU output drive port 92, and a torque limiting device 94. The actuator interface 88 may be configured with one or more surfaces (e.g., alignment features) that locate the portable MDU 84 relative to the actuator 74 in a predetermined arrangement to permit the portable MDU 84 to drive the actuator 74. The actuator interface 88 may include a mechanical arrangement that allows the portable MDU 84 to be held (e.g., releasably attached) to the actuator 74. The mechanical arrangement may be a mechanical fastener such as a clip, or a detent structure, or a pin and slot structure (e.g., where the portable MDU 84 is rotated to engage the pin within the slot), or the like, or any combination thereof. In some embodiments, one or more MDU mounting features 96 (e.g., brackets and the like; e.g., see FIGS. 8 and 9) may be attached to a structural panel to locate and/or support the portable MDU 84 when the portable MDU 84 is engaged with a respective actuator 74. The portable MDU mounting features 96 may be used in combination with the actuator interface 88 of the portable MDU 84 or as an alternative to the actuator interface 88 of the portable MDU 84. The present disclosure is not limited to any particular interface between the portable MDU 84 and the actuator 74, other than one that allows the portable MDU 84 to be used to drive the actuator 74.

The MDU output drive port 92 is configured to engage the actuator 74 in a manner that allows the portable MDU 84 to drive the actuator 74; e.g., drive the hydraulic powered actuator without the need to provide hydraulic power to the actuator, or drive the electrically powered actuator without the need to provide electrical power to the actuator. For example, the MDU output drive port 92 may be configured to form a mating male/female drive coupling with the actuator 74; e.g., the portable MDU 84 may have a male MDU output drive port 92 (e.g., a male splined shaft) that is receivable within a female actuator input drive port 98 (e.g., female splined receiver) of the actuator 74, or vice versa. Another example is a hexagonal male drive shaft and a receiver with a mating female hexagonal receiver. These male/female drive coupling examples are provided to illustrate possible drive couplings and the present disclosure is not intended to be limited thereto. In those instances wherein the actuator 74 is a hydraulic powered actuator, the actuator input drive port 98 may be sealed to prevent hydraulic fluid leakage.

The MDU input drive port 90 is configured to form a drive engagement with an operator drive input (not shown). For example, in some embodiments the MDU input drive port 90 may be configured to be driven manually by the operator using a manual tool (e.g., a speed wrench, ratchet, or the like) or driven using a power tool (e.g., a powered ratchet, drill, impact driver, or the like) having a bit, socket, or the like that mates with the MDU input drive port 90. In the diagrammatic example shown in FIG. 10, the MDU input drive port 90 is shown having a hexagonal receiver for receiving a male hexagonal tool bit. The portable MDU 84 is configured such that driving the MDU input drive port 90 causes the MDU output drive port 92 to be driven, subject to the torque limiting device 94 as will be detailed herein. In some embodiments, the portable MDU 84 may include a gear arrangement that enable the portable MDU 84 to operate as a reduction gear box to alter the input rotational speed and torque relative to the output rotational speed and torque.

The torque limiting device (TLD) 94 is configured to limit the amount of torque that can be delivered from the MDU input drive port 90 to the MDU output drive port 92. The torque limit may be set to a predetermined maximum torque value that cannot be exceeded, selected to avoid damage to the actuator 74 and the rest of the actuation system that is interconnected to the actuator that the MDU 84 is connected to or other components within the present disclosure TRAS 73. A non-limiting example of a torque limiting device is a clutch.

To manually translate the thrust reverser translating sleeve 66 (e.g., from a stowed configuration to a deployed configuration) using the present disclosure TRAS (e.g., during a maintenance procedure), the first and second fan cowl members 64A, 64B may be pivoted from a closed position to an open position to reveal the TRAS actuators 74. The portable MDU 84 may be removed from the stowage bracketry 86 and engaged with an actuator 74. The portable MDU 84 may then be operated by a tool (manual or powered) to drive the actuator 74. As detailed herein, driving the actuator 74 causes thrust reverser translating sleeve 66 to translate (e.g., from a stowed position to a deployed position). Depending on the TRAS 73, it may be useful to sequentially drive the actuators 74 to translate the thrust reverser translating sleeve 66 from the stowed position to a deployed position. In that case, the portable MDU 84 may be sequentially engaged with the respective actuators 74. Once the thrust reverser translating sleeve 66 is axially translated to the desired position, the portable MDU 84 may be stored with the stowage bracketry 86. When the maintenance procedure is completed, the thrust reverser translating sleeve 66 can be axially translated from the deployed position to the stowed position using the portable MDU 84; e.g., the portable MDU 84 may be removed from the stowage bracketry 86 and engaged with an actuator 74, and may be used to drive the actuator 74 in the opposite direction. Once the thrust reverser translating sleeve 66 is translated to the stowed position, the portable MDU 84 may be stored with the stowage bracketry 86.

In some embodiments, the present disclosure TRAS may include safety features to ensure that the portable MDU 84 has been disengaged with the respective actuator 74 and returned to the stowage bracketry 86. For example, as diagrammatically shown in FIGS. 8 and 9, safety features in the form of a blocker 100 may be attached to the first and second fan cowl members 64A, 64B. The blockers 100 may be positioned and configured such that when the portable MDU 84 is stored with the stowage bracketry 86, the first and second fan cowl members 64A, 64B may be disposed in the closed position; see FIG. 8. The position and configuration of the blockers 100 may be such that if the portable MDU 84 is disposed engaged with an actuator 74, the blocker 100 will interfere with the engaged portable MDU 84 and prevent the respective fan cowl member 64A, 64B from rotating into a closed position. FIG. 9, for example, diagrammatically shows the blocker 100 attached to the second fan cowl member 64B in contact with the portable MDU 84 still engaged with an actuator 74. In this manner, the portable MDU 84 must be stowed before the fan cowl members 64A, 64B 20 can be closed. In addition to the blockers 100, or as an alternative to the blockers 100, sensors may be used to sense the position of the portable MDU 84 to ensure that the portable MDU 84 is properly stowed.

The present disclosure TRAS 73, including the portable MDU 84 and actuators 74 configured for use with the portable MDU 84, is understood to provide several benefits. An actuator 74 that includes an MDU permanently attached to the actuator 74 must be configured to support the portable MDU 84, which typically increases the weight, complexity, and cost of the actuator 74. Some TRAS configurations include an MDU permanently attached to each actuator. That increases the cost and the weight of the TRAS. An MDU that is permanently attached to an actuator must be tested and approved as part of the TRAS; e.g., ability to withstand vibrational loads, fire resistance, etc. If the MDU is not attached to the actuator during flight, it likely will not be subject to the same qualification requirements.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft nacelle, comprising:
 a fan cowl including a first cowl member and a second cowl member, the first cowl member and the second cowl member pivotally disposable in a closed position or in an open position, the first cowl member including a first blocker, the second cowl member including a second blocker;
 a thrust reverser translating sleeve, wherein the fan cowl and the thrust reverser translating sleeve are configured to circumferentially enclose an engine; and
 a thrust reverser including a thrust reverser actuation system (TRAS), the TRAS comprising:
  a first actuator and a second actuator, each configured to translate the thrust reverser translating sleeve linearly between a thrust reverser translating sleeve stowed position and a thrust reverser translating sleeve deployed position, and each having an actuator input drive port; and
  a portable manual drive unit (MDU) having an MDU input drive port, an MDU output drive port, and a torque limiting device, wherein the MDU output drive port is configured for engagement with the actuator input drive port;
 wherein the first actuator and the second actuator are circumferentially spaced apart from one another, wherein the portable MDU is configured for releasable engagement with the first actuator to drive the first actuator, and the portable MDU is configured for releasable engagement with the second actuator to drive the second actuator;
 wherein the first blocker is configured to contact the portable MDU when the portable MDU is engaged with the first actuator and thereby prevent the first cowl member from being disposed in the closed position when the portable MDU is engaged with the first actuator, and the second blocker is configured to contact the portable MDU when the portable MDU is engaged with the second actuator and thereby prevent the second cowl member from being disposed in the closed position when the portable MDU is engaged with the second actuator.

2. The aircraft nacelle of claim 1, wherein the first fan cowl member and the second cowl member are pivotally attached adjacent a gravitational top of the nacelle; and
 wherein the TRAS is configured such that the portable MDU is not engaged with either the first actuator or the second actuator when the first fan cowl member and the second cowl member are disposed in the closed position.

3. The aircraft nacelle of claim 2, wherein the first actuator is disposed adjacent the first cowl member and the second actuator is disposed adjacent the second cowl member.

4. The aircraft nacelle of claim 1, further comprising stowage bracketry configured to retain the MDU.

5. The aircraft nacelle of claim 1, wherein the MDU input drive port is configured for engagement with a driving tool.

6. The aircraft nacelle of claim 1, wherein the first actuator and the portable MDU are configured for releasable attachment to one another, and the second actuator and the portable MDU are configured for releasable attachment to one another.

7. The aircraft nacelle of claim 1, further comprising one or more first mounting brackets disposed adjacent the first actuator configured to positionally locate the portable MDU relative to the first actuator when the portable MDU is engaged with the first actuator, and one or more second mounting brackets disposed adjacent the second actuator configured to positionally locate the portable MDU relative to the second actuator when the portable MDU is engaged with the second actuator.

8. The aircraft nacelle of claim 1, wherein the thrust reverser includes a cascade, and the cascade is exposed when the thrust reverser translating sleeve is disposed in the thrust reverser translating sleeve deployed position, and the cascade is covered when the thrust reverser translating sleeve is in the thrust reverser translating sleeve stowed position.

9. A method of actuating a thrust reverser portion of a nacelle, the nacelle including a fan cowl and a thrust reverser translating sleeve, the fan cowl including a first cowl member and a second cowl member, the first cowl member and the second cowl member pivotally disposable in a closed position or an open position, and the fan cowl and the thrust reverser translating sleeve are configured to circumferentially enclose an engine, the method comprising:
 providing a first actuator and a second actuator, each configured to translate the thrust reverser translating sleeve linearly between a thrust reverser translating sleeve stowed position and a thrust reverser translating sleeve deployed position, and each having an actuator input drive port, wherein the first actuator and the second actuator are circumferentially spaced apart from one another; and using a portable manual drive unit (MDU) having an MDU input drive port, an MDU output drive port, and a torque limiting device, to drive the first actuator to translate the thrust reverser translating sleeve, and using the portable MDU to drive the second actuator to translate the thrust reverser translating sleeve;

wherein the first actuator and the second actuator are circumferentially spaced apart from one another, wherein the portable MDU is configured for releasable engagement with the first actuator to drive the first actuator, and the portable MDU is configured for releasable engagement with the second actuator to drive the second actuator; and wherein the first cowl member includes a first blocker configured to contact the portable MDU when the portable MDU is engaged with the first actuator and thereby prevent the first cowl member from being disposed in the closed position when the portable MDU is engaged with the first actuator, and the second cowl member includes a second blocker configured to contact the portable MDU when the portable MDU is engaged with the second actuator and thereby prevent the second cowl member from being disposed in the closed position when the portable MDU is engaged with the second actuator.

10. The method of claim 9, wherein the first cowl member and the second cowl member are pivotally attached adjacent a gravitational top of the nacelle, and the method further includes:

disengaging the portable MDU from the first actuator prior to disposing the first fan-cowl member in the closed position, and disengaging the portable MDU from the second actuator prior to disposing the second fan cowl member in the closed position.

11. The method of claim 10, wherein the first actuator is disposed adjacent the first cowl member and the second actuator is disposed adjacent the second cowl member.

12. The method of claim 9, further comprising the step of securing the portable MDU to the nacelle using stowage bracketry when the portable MDU is not being used.

13. The method of claim 9, wherein the first actuator and the portable MDU are configured for releasable attachment to one another, and the second actuator and the portable MDU are configured for releasable attachment to one another.

14. A thrust reverser actuation system, comprising:

an actuator configured to translate a thrust reverser translating sleeve linearly between a stowed position and a deployed position, the actuator including an actuator input drive port; and a portable manual drive unit (MDU) having an MDU input drive port, an MDU output drive port, and a torque limiting device, wherein the MDU output drive port is configured for engagement with the actuator input drive port;

wherein a fan cowl member encloses the thrust reverser actuation system when the fan cowl member is disposed in a closed position, the fan cowl member disposable between an open position and the closed position, the fan cowl member including a blocker;

wherein the portable MDU is configured for releasable engagement with the actuator;

wherein the blocker is configured to contact the portable MDU when the portable MDU is engaged with the actuator and thereby prevents the cowl member from being disposed in the closed position when the portable MDU is engaged with the actuator.

\* \* \* \* \*